Oct. 31, 1967  D. P. HOURIGAN ET AL  3,350,257
PLASTIC-COVERED GYPSUM WALLBOARD
Filed April 5, 1960  3 Sheets-Sheet 1

INVENTOR.
Daniel P. Hourigan
BY John D. Shull Jr.

ATTORNEY

Oct. 31, 1967  D. P. HOURIGAN ET AL  3,350,257
PLASTIC-COVERED GYPSUM WALLBOARD
Filed April 5, 1960  3 Sheets-Sheet 3

INVENTOR.
Daniel P. Hourigan
BY John D. Shull Jr.

ATTORNEY

United States Patent Office 3,350,257
Patented Oct. 31, 1967

3,350,257
PLASTIC-COVERED GYPSUM WALLBOARD
Daniel P. Hourigan and John D. Shull, Jr., Tonawanda, N.Y., assignors to National Gypsum Company, Buffalo, N.Y., a corporation of Delaware
Filed Apr. 5, 1960, Ser. No. 20,109
5 Claims. (Cl. 161—43)

This invention relates to improved gypsum wallboard with plastic film or sheeting adhesively secured thereon and to the method of making the same.

A great number of varying building products have been developed and are available now for providing the base structure and/or the exposed surface structure for interior building walls, with the characteristics and costs of each varying widely, one to another. For example, the well known paper enclosed, gypsum core, gypsum wallboard, of relatively low cost, is commonly used as the exposed surface structure, without any separate base structure, or, in the slightly modified form well known as gypsum lath, as the base structure for plaster walls or, third, it is laminated with itself wherein one lamination forms a base structure and the outer lamination forms the exposed surface structure.

In all of these types of wall structures, considerable subsequent preparation and/or redecoration is necessary to maintain a satisfactory interior wall. With the single-ply gypsum wallboard structures, special joint treatment techniques, followed by painting and periodic repaintings are necessary. A typical present alternative involves the use of a fabric-backed plastic sheeting applied in the manner of wallpaper, avoiding the necessity of subsequent maintenance, but involving numerous problems in application as well as certain critical limitations in its applicability.

It is an object of the present invention to provide a gypsum wallboard product having the durability and maintenance free quality of the fabric-backed plastic sheet covered walls, which may be applied directly to building studs, or laminated directly over cracked and unsightly walls without need of first repairing and smoothing such walls.

It is a further object to provide a novel maintenance free interior wall of rich quality at markedly lower costs for material and labor.

It is a further object to provide a novel method of making an improved gypsum wallboard product suitable for maintenance free interior wall surfaces.

These and other objects of the invention will be more readily apparent when considered in relation to the preferred embodiments as set forth in the specification and shown in the drawings in which.

Figure 1:
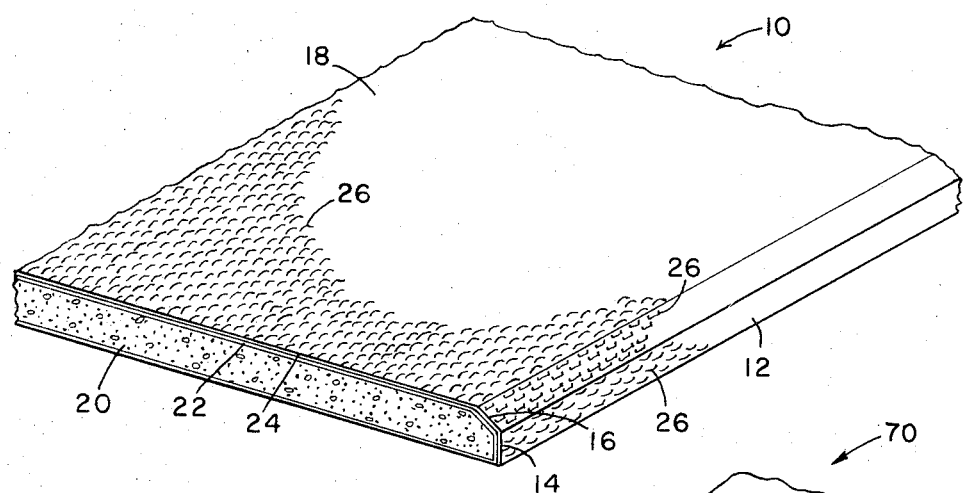
FIG. 1 is a perspective view of a section of the plastic-covered gypsum wallboard of the present invention.

Referring now to the drawings, there is shown a small section, typical of about four inches square, of wallboard 10 constructed in accordance with the invention. The section shown includes one side edge 12 having a flat portion 14 perpendicular to the general plane of the board and a beveled portion 16 adjacent the front face 18 of the board.

The board 10 is constructed of a set gypsum core 20, providing the structural solidity, paper-cover sheets 22 enveloping the gypsum core 20, providing the tensile and flexural strengths, and a novel embossed vinyl sheet 24 adhesively laminated to the paper cover sheets extending throughout the front face 18, the beveled edge portions 16, and the flat edge portions 14, providing a tough, permanently decorated board surface. By the term "vinyl sheet" we mean a vinyl resin, as such is generally understood, however said sheets are referred to hereinafter as merely "vinyl."

The vinyl sheet 24 has an average material thickness of .006 inch, but, by reason of its embossed form, has a total overall thickness of .015 inch. As shown in the drawings, the sheet has raised embossments, 26, 26, throughout the entire extent thereof, having a generally rectangular form of 0.15 inch length by 0.05 inch width aligned in the machine direction of the sheet 24, and having a .008 to .010 inch depth. Broadly, in accordance with the invention, embossments of about .001 to .012 inch depth are provided throughout said sheet, preferably at an average spacing in any direction of about 10 per inch.

Figure 2:
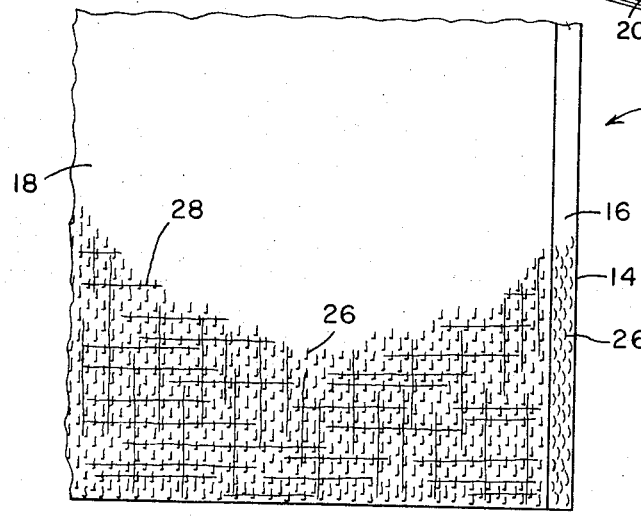
FIG. 2 is a face view of the section of wallboard of FIG. 1.
Figure 3:
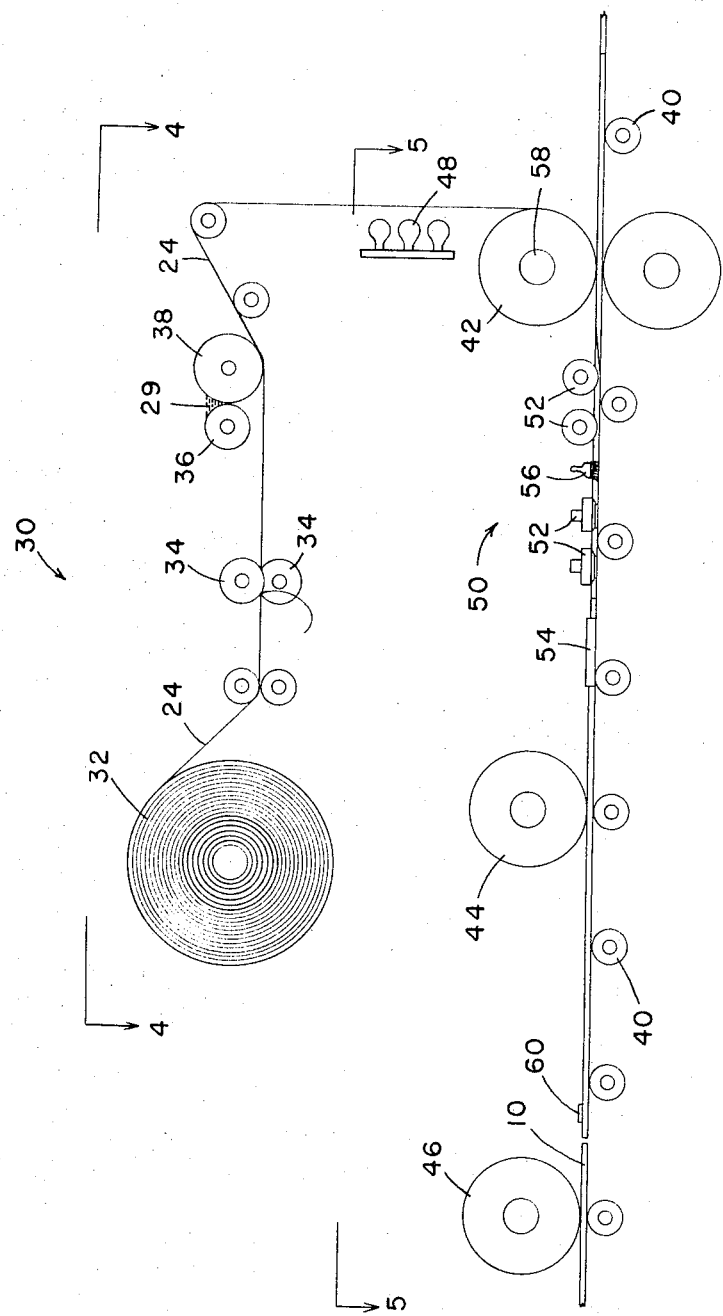
FIG. 3 is a schematic elevational view of the apparatus for making the wallboard of FIG. 1.
Figure 4:
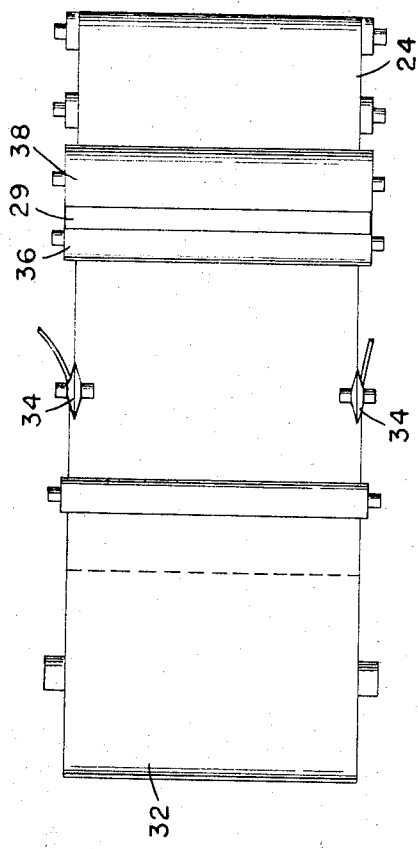
FIG. 4 is a schematic top view of the apparatus of FIG. 3 taken on the line 4—4.
Figure 5:
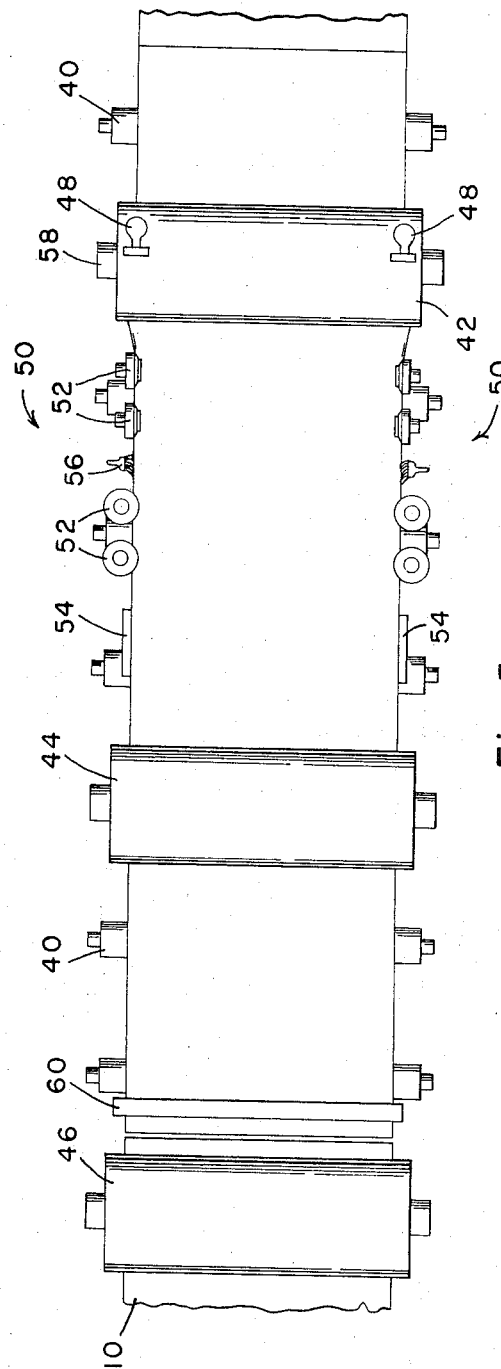
FIG. 5 is a schematic sectional view of the apparatus of FIG. 3 taken on the line 5—5.

As seen in the face view of FIG. 2, a generally abstract design 28 is printed on the vinyl sheet 24. Any break which might be present in a design 28 when made by roll printing is normally untenable in flat expanses the size of wallboards, but when combined with a full embossment, as shown, such breaks in a pattern are substantially completely indiscernible. This is particularly true with the combining, as shown of designs and embossments of substantially similar direction, design and spacing, whereby the embossing and design complement and de-emphasize one another.

The vinyl sheet 24 is adhered to the paper cover sheet 22 thereunder by a polyvinyl acetate waterbased emulsion adhesive 29 having a tack time of no more than two minutes and preferably from one to two minutes, a typical preferred form being adhesive E–2135–B of the Arabol Manufacturing Company. This preferred adhesive has a solids content of slightly over 50%, a pH of about 3.0, a weight of about 9 pounds per gallon and a viscosity of from 4800 to 5200 centipoises using an LVF Brookfield viscometer, with a #4 spindle at 60 revolutions per minute at 25° C.

The vinyl sheet 24, with an average thickness in accordance with the invention of from .004 to .008 inch, is necessarily of the class known in the plastic film and sheet are as semi-rigid, or, to define the stiffness in greater particularity, having a stiffness, when flexed by a folding extending in the machine direction, of from 0.30 to 0.90 stiffness units as determined by a Taber V5 stiffness tester, when tested in a zero to 10 units range as specified for testing with this test equipment by the manufacturer, Taber Instrument Corporation, North Tonawanda, N.Y. Markedly higher stiffness is preferred in the across machine direction, in the order of 2.0 stiffness units, however, it is only essential that it be at least a minimum of 0.30 stiffness units.

The above specified stiffness range of the vinyl sheet is essential to obtain the necessary permanence of the embossments 26, 26 in a sheet which is simultaneously susceptible of being formed and adhering in accordance with the following method of manufacture of the wallboard 10.

The paper cover sheets 22 and set gypsum core 20 therein are formed, and the core set and dried in accordance with standard manufacturing procedure for gypsum wallboard, with the edge portions thereof then formed to include both a beveled and flat portion as shown in the drawings. To apply the vinyl sheet 24 to the set and dried paper-covered gypsum board, a laminating machine 30 in accordance with the invention and as described hereafter, is prepared for operation.

The laminating machine 30 includes, generally, a supply roll 32 of vinyl sheet 24, edge slitters 34, 34 adhesive gauging roller 36, adhesive applying roller 38, wallboard conveyor 40, a master roll 42, two press rolls 44, 46, sheet edge heaters 48 and sheet edge adhering means 50.

As set and dried paper-covered gypsum boards, without the vinyl sheet yet applied, are continuously fed onto and along conveyor 40 toward the master roll 42, a continuous web of vinyl sheet 24 is supplied from supply roll 32 to the edge slitters 34, 34. A narrow strip of edge portion of vinyl sheet 24 is removed by slitters 34, 34 to provide a constant width, evenly centered web of vinyl sheet which is continuously advanced therefrom to under and in contact with the adhesive applying roller 38. Thence, the vinyl sheet 24 is directed in its movement downwardly and under the master roll 42 with the adhesive coated surface thereof disposed atop the paper covered gypsum board, sufficient excess vinyl sheet extending beyond said edge 12 of the gypsum board to cover, when folded, substantially all of the side edge 12.

The adhesive gauging roller 36, rotatably disposed in parallel, closely horizontally spaced apart relation from the adhesive applying roller 38, forms, in combination with the roller 38, means for retaining a bank of adhesive 29 and applying a constant thickness of adhesive 29 on the adhesive applying roller 38 for transfer therefrom to the vinyl sheet 24 as the sheet passes thereunder in contact therewith. The adhesive 29 is preferably applied to the vinyl sheet 24 at a rate of about ten pounds of emulsion per thousand square feet of vinyl sheet, however this may be varied to in the order of from five to fifteen pounds per thousand square feet.

The sheet edge heaters 48 are disposed adjacent each edge of vinyl sheet 24 at a point in the sheet travel substantially immediately prior to the passing of the sheet under the master roll 42 whereby the edges of the vinyl sheet are caused to be more flexible and susceptible to being formed to conform to the shape of the side edges 12 with a minimum of a tendency to become unadhered, once formed. The two heaters 48 each include, in the present embodiment, three electric heat lamps arranged in line with the travel of the vinyl sheet and disposed approximately two inches therefrom, however the number, size and spacing of the form of heaters 48 employed will vary with other variables of the invention and may be determined by increasing the amount of heat and decreasing the time between heating and forming edges to an amount which still avoids damaging the embossed form and the strength and appearance of the vinyl sheet.

Immediately after adhesively disposing the vinyl sheet 24 centered on the paper-covered sheet 22 of the boards 10, at the master roll 42, the sheet edge adhering means 50 fold and cause to be firmly adhered to the edges of the vinyl sheet 24 to the paper-covered sheet 22 at the board edges 12. The sheet edge adhering means includes on each edge a series of rollers 52 and rubbing felts 54. The rollers 52 with outer peripheries disposed to roll flush against the board edge flat portion 14 and beveled portion 16, have been found insufficient by themselves for firmly adhering the vinyl sheet at the edges 12, the rolling action of rollers having been found to apparently cause a lifting action to the vinyl sheet as the sheet and wheel separate. Rubbing felts 54, or other equivalent stationary rubbing means, have been found to provide a form of pressing and adhering essential to making a permanently adhered folded edge portion of the vinyl sheet 24. One rubbing felt on each edge having a length of at least about one inch disposed flush against the flat portion 14, fixed relative to the direction of movement of board 10 therealong, and resiliently urged toward the flat portion by springs providing about one pound per square inch pressure, is sufficient to provide a permanent folded and adhered edge portion, however, in the preferred form, rubbing felts of about one foot in length contacting the flat portion 14 are employed. An alternative stationary rubbing element, which is shown employed simultaneously with each felt 54 in the present embodiment, is a relatively stiff bristled wide brush 56, resiliently urged against a two inch length of flat portion 14, and which provides a constant stationary pressure therealong as the board edge is moved generally perpendicularly to the brush 56.

The master roll 42 and press rolls 44, 46 are preferably of identical structure, having a resilient rubber outer layer, being slightly over four feet in length and about 15 inches in diameter, and weighing about 200 pounds. The master roll 42 is rotatably mounted on a central shaft 58 for rolling contact of the roll 42 with the vinyl sheet and board passing thereunder, such that substantially all of the weight of the master roll is supported by the shaft, and substantially no pressure is applied to the vinyl sheet and board, providing a smooth, even, undistorted application of the vinyl sheet to the board. Press roll 44 and 46 are rotatably mounted with sufficient vertical tolerance such that the press rolls are raised when board 10 passes thereunder and the full weight of the press rolls is applied to firmly and permanently adhere the vinyl sheet 24 to the paper cover sheet 22.

After being subjected to the first press rolls 44, the vinyl sheet 24 is slit as by cutting with a knife along the edge of a slitting guide 60 after placing the said guide edge over an end edge of a board. Since this slitting is often damaging to the bond between the vinyl sheet 24 and the paper cover sheet 22 adjacent the slit, the second press roll 46 serves the primary purpose of resecuring this bond adjacent the slit.

The vinyl-covered wallboard 10 is applied, in new construction, directly to wood studs providing in a single operation a completely finished and decorated wall requiring no immediate or subsequent redecoration throughout the normal life of a building, or in refinishing old structure existing walls, directly to the existing walls without need of any initial repairing of cracks or other flaws, by means, in either case, of predecorated colored nails driven therethrough or by means of adhesively affixing the wallboard 10 directly to the studs or old existing wall. An unusually desirable wall is thus provided by a highly simplified single process, at very low cost, which requires no further redecoration other than washing, and which will withstand without any apparent effect far greater numbers of washings than would ever be experienced by a wall during the life of such wall.

Figure 6:
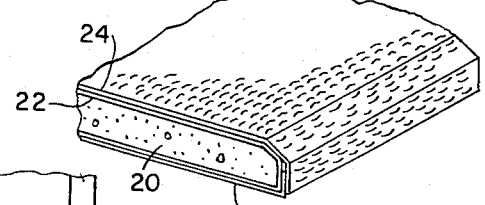
FIG. 6 is a perspective view of a section of plastic-covered gypsum wallboard of a modified form of the present invention.

In a modified form of the invention, a second vinyl sheet 72 is applied in completely similar manner to the back face of the board 70, see FIG. 6, whereby a single plastic covered board 70 provides improved finished wall surfaces on both sides forming a complete partition when mounted in floor and ceiling channels in accordance with known forms of constructing solid partitions.

Having completed a detailed disclosure of the preferred embodiments of our invention so that those skilled in the art may practice the same, we contemplate that variations may be made without departing from the essence of the invention or the scope of the appended claims.

We claim:
1. A plastic-sheet-covered gypsum wallboard consisting essentially of a set gypsum core enclosed in paper cover sheets and having adhesively laminated to at least one face and two side edges thereof a thin, highly durable, semi-rigid, embossed plastic sheet, said embossed plastic sheet having an average thickness of sheet material of from .004 to .008 inch and a total thickness measured from peaks of embossments of from .007 to .012 inch greater than the average thickness of said sheet material, said plastic sheet material having a stiffness, as determined by a Taber V5 stiffness tester when tested in a zero to 10 units range, of 0.30 to 0.90 stiffness units when flexed by a folding extending in the machine direction of the said sheet, and of at least 0.30 stiffness unit when flexed by a folding extending perpendicular to the machine direction of said sheet, said plastic sheet conforming to the contour of the wallboard.

2. A plastic-sheet-covered gypsum wallboard as defined in claim 1 wherein one said plastic sheet extends completely throughout one face and two side edges of said wallboard and a second said plastic sheet extends completely throughout the opposite face and two side edges of said wallboard.

3. A plastic-sheet-covered gypsum wallboard as defined in claim 1 wherein said paper-covered gypsum wallboard has bevelled side edges and said plastic sheet conforms to said bevelled side edges.

4. A plastic-sheet-covered gypsum wallboard as defined in claim 1, wherein the said embossments of said plastic sheet are of a repetitive pattern throughout said sheet, said embossments being spaced on an average of about 10 embossments per inch.

5. A plastic-sheet-covered gypsum wallboard as defined in claim 4, wherein said plastic sheet has a roll-printed repetitive design printed therein, said embossments throughout said plastic sheet causing breaks in said repetitive printed design to be substantially indiscernible over the large expanse of the wallboard face.

References Cited

UNITED STATES PATENTS

| | | | |
|---|---|---|---|
| 1,379,837 | 5/1921 | Ruppel | 154—45.9 |
| 1,824,245 | 9/1931 | Utzman | 154—45.9 |
| 1,983,532 | 12/1934 | Brand | 154—45.9 |
| 1,985,480 | 12/1934 | Carpenter. | |
| 2,239,860 | 4/1941 | Roos | 154—86 |
| 2,310,217 | 2/1943 | Crandell | 154—45.9 |
| 2,352,553 | 6/1944 | Lefebure | 154—86 |
| 2,581,076 | 1/1952 | Camp | 156—44 |
| 2,779,979 | 2/1957 | Sundelin et al. | 20—74 |
| 2,949,394 | 8/1960 | Rodman. | |
| 3,083,133 | 3/1963 | Hansen et al. | 161—116 |

OTHER REFERENCES

Modern Plastics (pp. 164 and 165 cited), June 1954.

EARL M. BERGERT, *Primary Examiner.*

CARL F. KRAFFT, ALEXANDER WYMAN,
*Examiners.*

C. STEIN, R. J. ROCHE, *Assistant Examiners.*

UNITED STATES PATENT OFFICE
CERTIFICATE OF CORRECTION

Patent No. 3,350,257                  October 31, 1967

Daniel P. Hourigan et al.

It is hereby certified that error appears in the above numbered patent requiring correction and that the said Letters Patent should read as corrected below.

Column 2, line 20, for ".001" read -- .007 --; line 48, for "are" read -- art --; column 3, line 56, for "paper-covered" read -- paper cover --.

Signed and sealed this 12th day of November 1968.

(SEAL)
Attest:

Edward M. Fletcher, Jr.
Attesting Officer

EDWARD J. BRENNER
Commissioner of Patents